United States Patent
Raney

(10) Patent No.: US 11,489,745 B2
(45) Date of Patent: Nov. 1, 2022

(54) METHODS, SYSTEMS AND COMPUTER READABLE MEDIA FOR PROVIDING A DECLARATIVE NETWORK MONITORING ENVIRONMENT

(71) Applicant: Keysight Technologies, Inc., Santa Rosa, CA (US)

(72) Inventor: Kristopher Len Raney, Oak Park, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/653,961

(22) Filed: Oct. 15, 2019

(65) Prior Publication Data
US 2021/0111975 A1    Apr. 15, 2021

(51) Int. Cl.
*H04L 43/08*    (2022.01)
*H04L 41/22*    (2022.01)
*H04L 41/12*    (2022.01)
*H04L 41/0806*    (2022.01)

(52) U.S. Cl.
CPC .......... *H04L 43/08* (2013.01); *H04L 41/0806* (2013.01); *H04L 41/12* (2013.01); *H04L 41/22* (2013.01)

(58) Field of Classification Search
CPC ..... H04L 43/08; H04L 41/0806; H04L 41/12; H04L 41/22
See application file for complete search history.

(56) References Cited

U.S. PATENT DOCUMENTS

| | | |
|---|---|---|
| 5,434,848 A | 7/1995 | Chimento, Jr. et al. |
| 6,574,661 B1 | 6/2003 | Delano et al. |
| 6,718,535 B1 | 4/2004 | Underwood |
| 7,089,316 B2 | 8/2006 | Andersen et al. |
| 7,100,195 B1 | 8/2006 | Underwood |

(Continued)

FOREIGN PATENT DOCUMENTS

WO    WO 2018/149498 A1    8/2018

OTHER PUBLICATIONS

Final Office Action for U.S. Appl. No. 16/219,888 (dated Oct. 14, 2020).

(Continued)

*Primary Examiner* — William G Trost, IV
*Assistant Examiner* — Monishwar Mohan

(57) ABSTRACT

The subject matter described herein includes methods, systems, and computer readable media for providing a declarative network monitoring environment. A method for providing a declarative network monitoring environment includes providing an available tool registry for storing tool information associated with networking monitoring tools that are available for use; providing a potential tool registry for storing tool information associated with networking monitoring tools that are potentially available for use; receiving declarative network monitoring input indicating a desire by a user to perform a monitoring related task; determining, using the declarative network monitoring input and the available tool registry and/or the potential tool registry, at least one set of tool configurations for configuring network monitoring tools to perform the monitoring related task; and providing the at least one set of tool configurations.

16 Claims, 7 Drawing Sheets

(56) References Cited

U.S. PATENT DOCUMENTS

| | | | |
|---|---|---|---|
| 7,284,234 | B2 | 10/2007 | Steg et al. |
| 7,466,710 | B1 | 12/2008 | Clemm et al. |
| 7,526,681 | B2 | 4/2009 | Anafi et al. |
| 7,899,846 | B2 | 3/2011 | Flynn et al. |
| 8,316,438 | B1 | 11/2012 | Bush et al. |
| 8,355,316 | B1* | 1/2013 | Lushear ............ H04L 43/0817 370/242 |
| 8,458,111 | B2 | 6/2013 | Wolf et al. |
| 8,612,599 | B2 | 12/2013 | Tung et al. |
| 8,656,006 | B2 | 2/2014 | Cobb et al. |
| 8,869,107 | B2 | 10/2014 | Taylor et al. |
| 9,037,710 | B2 | 5/2015 | Gerber et al. |
| 9,043,747 | B2 | 5/2015 | Eksten et al. |
| 9,047,414 | B1 | 6/2015 | Matyjek |
| 9,077,760 | B2 | 7/2015 | McKeown et al. |
| 9,110,703 | B2 | 8/2015 | Santos et al. |
| 9,154,327 | B1 | 10/2015 | Marino et al. |
| 9,276,812 | B1 | 3/2016 | Nagargadde et al. |
| 9,471,463 | B1 | 10/2016 | Bates et al. |
| 9,575,732 | B2 | 2/2017 | Welicki et al. |
| 9,680,728 | B2 | 6/2017 | Besser |
| 9,760,928 | B2 | 9/2017 | Ward, Jr. et al. |
| 9,818,127 | B2 | 11/2017 | Iyoob et al. |
| 9,838,272 | B2 | 12/2017 | Djukic et al. |
| 9,875,087 | B2 | 1/2018 | Scholz et al. |
| 10,178,003 | B2 | 1/2019 | Raney et al. |
| 10,338,958 | B1 | 7/2019 | Kamboj et al. |
| 10,534,701 | B1 | 1/2020 | Pande et al. |
| 10,541,901 | B2 | 1/2020 | Raney |
| 10,733,088 | B1 | 8/2020 | Sommers |
| 10,764,169 | B2 | 9/2020 | Mircescu |
| 10,812,349 | B2 | 10/2020 | Raney et al. |
| 10,951,509 | B1 | 3/2021 | Liu et al. |
| 11,038,770 | B2 | 6/2021 | Raney |
| 2001/0052013 | A1 | 12/2001 | Munguia et al. |
| 2002/0174180 | A1 | 11/2002 | Brown et al. |
| 2004/0117802 | A1 | 6/2004 | Green |
| 2006/0028999 | A1 | 2/2006 | Iakobashvili et al. |
| 2006/0075093 | A1 | 4/2006 | Frattura et al. |
| 2007/0234293 | A1 | 10/2007 | Noller et al. |
| 2008/0201468 | A1 | 8/2008 | Titus |
| 2009/0112683 | A1 | 4/2009 | Hamilton, II et al. |
| 2010/0115606 | A1 | 5/2010 | Samovskiy et al. |
| 2010/0318974 | A1 | 12/2010 | Hrastnik et al. |
| 2011/0004698 | A1 | 1/2011 | Wu |
| 2011/0231552 | A1 | 9/2011 | Carter et al. |
| 2011/0235991 | A1 | 9/2011 | Luthra et al. |
| 2011/0307889 | A1 | 12/2011 | Moriki et al. |
| 2012/0079480 | A1 | 3/2012 | Liu |
| 2012/0089727 | A1 | 4/2012 | Raleigh et al. |
| 2012/0185913 | A1 | 7/2012 | Martinez et al. |
| 2012/0191545 | A1 | 7/2012 | Leibu et al. |
| 2012/0210318 | A1 | 8/2012 | Sanghvi et al. |
| 2013/0031233 | A1 | 1/2013 | Feng et al. |
| 2013/0262931 | A1 | 10/2013 | Siddalingesh |
| 2013/0291109 | A1 | 10/2013 | Staniford et al. |
| 2013/0305357 | A1 | 11/2013 | Ayyagari et al. |
| 2014/0006597 | A1 | 1/2014 | Ganguli et al. |
| 2014/0026122 | A1 | 1/2014 | Markande et al. |
| 2014/0047272 | A1 | 2/2014 | Breternitz et al. |
| 2014/0047342 | A1* | 2/2014 | Breternitz ............ G06F 9/5061 715/735 |
| 2014/0180664 | A1 | 6/2014 | Kochunni et al. |
| 2014/0215443 | A1 | 7/2014 | Voccio et al. |
| 2014/0215450 | A1 | 7/2014 | Salisbury et al. |
| 2014/0229605 | A1 | 8/2014 | Besser |
| 2014/0278623 | A1 | 9/2014 | Martinez et al. |
| 2014/0278808 | A1 | 9/2014 | Iyoob et al. |
| 2015/0052499 | A1 | 2/2015 | Finch et al. |
| 2015/0263889 | A1 | 9/2015 | Newton |
| 2015/0319030 | A1 | 11/2015 | Nachum |
| 2015/0324182 | A1 | 11/2015 | Barros et al. |
| 2015/0339107 | A1 | 11/2015 | Krishnamurthy et al. |
| 2016/0020981 | A1* | 1/2016 | Raney ................ H04L 47/22 709/224 |
| 2016/0094383 | A1* | 3/2016 | Wang ................ H04L 41/12 709/221 |
| 2016/0094418 | A1 | 3/2016 | Raney |
| 2016/0094668 | A1 | 3/2016 | Chang et al. |
| 2016/0110211 | A1 | 4/2016 | Karnes |
| 2016/0269482 | A1 | 9/2016 | Jamjoom et al. |
| 2016/0359888 | A1 | 12/2016 | Gupta et al. |
| 2016/0364307 | A1 | 12/2016 | Garg et al. |
| 2017/0006135 | A1 | 1/2017 | Siebel et al. |
| 2017/0090463 | A1 | 3/2017 | Wang |
| 2017/0099195 | A1 | 4/2017 | Raney |
| 2017/0118102 | A1 | 4/2017 | Majumder et al. |
| 2017/0163510 | A1 | 6/2017 | Arora et al. |
| 2017/0171033 | A1* | 6/2017 | Lucas .................. H04L 41/145 |
| 2017/0171034 | A1 | 6/2017 | Lucas et al. |
| 2017/0180318 | A1 | 6/2017 | Lutas et al. |
| 2017/0180567 | A1 | 6/2017 | Sharma et al. |
| 2017/0193448 | A1* | 7/2017 | Piyush ................ H04L 67/1044 |
| 2017/0353351 | A1 | 12/2017 | Cheng et al. |
| 2018/0041477 | A1 | 2/2018 | Shaposhnik |
| 2018/0096105 | A1 | 4/2018 | Bleicher et al. |
| 2018/0152884 | A1 | 5/2018 | Hu et al. |
| 2018/0176106 | A1 | 6/2018 | Raney et al. |
| 2018/0206100 | A1 | 7/2018 | Eisner et al. |
| 2019/0007453 | A1 | 1/2019 | Nimmagadda et al. |
| 2019/0034957 | A1 | 1/2019 | Koryakin et al. |
| 2019/0044583 | A1 | 2/2019 | Garcia |
| 2019/0045008 | A1 | 2/2019 | Murthy et al. |
| 2019/0052549 | A1 | 2/2019 | Duggal et al. |
| 2019/0089617 | A1 | 3/2019 | Raney |
| 2019/0109777 | A1 | 4/2019 | Mircescu |
| 2019/0213326 | A1 | 7/2019 | Dykes |
| 2019/0238422 | A1 | 8/2019 | Raney |
| 2019/0260651 | A1 | 8/2019 | Raney et al. |
| 2020/0356674 | A1* | 11/2020 | Nikolai ................ G06F 21/577 |

OTHER PUBLICATIONS

Notice of Allowance and Fee(s) Due for U.S. Appl. No. 15/709,433 (dated Oct. 18, 2019).

Advisory Action for U.S. Appl. No. 15/729,061 (dated Apr. 15, 2020).

Non-Final Office Action for U.S. Appl. No. 16/219,888 (dated Apr. 6, 2020).

Non-Final Office Action for U.S. Appl. No. 15/729,061 (dated Oct. 10, 2019).

Notice of Allowance and Fee(s) Due for U.S. Appl. No. 15/709,433 (dated Aug. 23, 2019).

Non-Final Office Action for U.S. Appl. No. 15/709,433 (dated Apr. 8, 2019).

Commonly-assigned, co-pending U.S. Appl. No. 16/251,019 for "Methods, Systems and Computer Readable Media for Triggering On-Demand Dynamic Activation of Cloud-Based Network Visibility Tools," (Unpublished, filed Jan. 17, 2019).

Notice of Allowance and Fee(s) Due for U.S. Appl. No. 15/379,966 (dated Sep. 5, 2018).

Ex Parte Quayle Action for U.S. Appl. No. 15/379,966 (Jun. 13, 2018).

International Search Report and Written Opinion for International Patent Application Serial No. PCT/US2017/063909 (dated Mar. 1, 2018).

"Kubernetes," Wikipedia, the free encyclopedia, https://en.wikipedia.org/wiki/Kubernetes, pp. 1-6 (Sep. 14, 2017).

"Ixia Cloudlens Private," Ixia, Data Sheet, 915-3736-01-6071 Rev A, pp. 1-15 (Aug. 21, 2017).

"Ixnetwork® Virtual Edition (VE) Virtualized Network Performance Testing," Ixia, A Keysight Business, Data Sheet, 915-2901-01-7061 Rev A, www.ixiacom.com, pp. 1-14 (Aug. 2017).

"The ABCs of Network Visibility," Ixia, pp. 1-57 (Jul. 5, 2017).

"Managed Detection and Response," esentire, Gartner Press Release, pp. 1-11 (Mar. 14, 2017).

"Amazon Virtual Private Cloud VPC Peering Guide," Amazon Web Services, Inc., pp. 1-61 (2017).

"Ixia Flex TapTM," Ixia, Document No. 915-6813-01 Rev B, pp. 1-5 (Oct. 2015).

(56) References Cited

OTHER PUBLICATIONS

"Ixia Phantom vTapTM with TapFlowTM Filtering," Ixia, Document No. 915-6805-01 Rev K, pp. 1-4 (Jul. 2015).
"Ixia xFilterTM," Ixia, Document No. 915-6804-01 Rev E, pp. 1-5 (May 2015).
Hofstede et al., "Flow Monitoring Explained: From Packet Capture to Data Analysis with NetFlow and IPFIX," IEEE Communications Surveys & Tutorials, vol. 16, Issue 4, pp. 2037-2064 (May 12, 2014).
Commonly-assigned, co-pending U.S. Appl. No. 16/434,825 for "Methods, Systems, and Computer Readable Media for Providing Intent-Driven Microapps for Execution on Communications Network Testing Devices," (Unpublished, filed Jun. 7, 2019).
Final Office Action for U.S. Appl. No. 15/729,061 (dated Feb. 6, 2020).
Notice of Allowance and Fee(s) Due for U.S. Appl. No. 15/729,061 (dated Jun. 12, 2020).
Advisory Action for U.S. Appl. No. 16/219,888 (dated Dec. 30, 2020).
Non-Final Office Action for U.S. Appl. No. 16/434,825 (dated Jun. 5, 2020).
Notice of Allowance and Fee(s) Due and Examiner-Initiated Interview Summary for U.S. Appl. No. 16/251,019 (dated May 27, 2020).
Notice of Allowance and Fee(s) Due for U.S. Appl. No. 16/219,888 (dated Mar. 24, 2021).
Notice of Allowance and Fee(s) Due for U.S. Appl. No. 16/434,825 (dated Dec. 18, 2020).

\* cited by examiner

FIG. 3A

```
91  metadata:
92    name: BYOD
93    creationDate:
94      formatted: "2019-09-02T15:39:08.932Z"
95      uid: 5d8723dd-e55a-4f76-bfd8-d0f1f32ef77f
96    labels:
97      - key: location
98        value: Branch Office
99  kind: Partition
100 parent:
101   - kind: Area
102     name: Branch Office
103 includes: []
104 resident:
105   - 10.4.1.0/24
106 boundaries:
107   - name: ByodBoundary
108 ---
109 metadata:
110   name: Vlan40
111   creationDate:
112     formatted: "2019-09-02T15:39:09.062Z"
113     uid: 3f9a54e5-ced2-4ef8-90c8-620d81cc927f
114 kind: VLANEncapsulation
115 performers:
116   - name: ByodBoundary
117 qtag: 40
118 ---
119 metadata:
120   name: Vlan37
121   creationDate:
122     formatted: "2019-09-02T15:39:08.99Z"
123     uid: cd0e5862-fe1f-4af7-aafb-90037eff4642
124 kind: VLANEncapsulation
125 performers:
126   - name: PrintBoundary
127 qtag: 37
128 ---
129 metadata:
130   name: Vlan25
131   creationDate:
```

```
132     formatted: "2019-09-02T15:39:09.06Z"
133     uid: f6caf743-8c1b-40a3-bbb2-91977cb69972
134 kind: VLANEncapsulation
135 performers:
136   - name: PhonesBoundary
137 qtag: 25
138 ---
139 metadata:
140   name: Vlan16
141   creationDate:
142     formatted: "2019-09-02T15:39:09.04Z"
143     uid: 7358fa7b-6375-44c0-9c7b-abc3ef1e953e
144 kind: VLANEncapsulation
145 performers:
146   - name: CompBoundary
147 qtag: 16
148 ---
149 metadata:
150   name: PrintBoundary
151   creationDate:
152     formatted: "2019-09-02T15:39:09.24Z"
153     uid: fa470f4e-6c6a-49a1-a01b-2cb60db1f03f
154 kind: Boundary
155 delimits:
156   - name: Printers
157 transformation:
158   - kind: VLANEncapsulation
159     name: Vlan37
160 ---
161 metadata:
162   name: CompBoundary
163   creationDate:
164     formatted: "2019-09-02T15:39:09.22Z"
165     uid: 781343a0-11f7-44c8-8662-7099940e4af6
166 kind: Boundary
167 delimits:
168   - name: Computers
169 transformation:
170   - kind: VLANEncapsulation
171     name: Vlan16
172 ---
```

FIG. 3B

```
360  - metadata:
361      name: PhonesBoundary
362      creationDate:
363        formatted: "2019-09-02T15:39:09.119Z"
364        uid: e6e5c3d4-de23-4403-a944-e922ed044376
365      kind: Boundary
366    delimits:
367    - name: Phones
368    transformation:
369      kind: VLANEncapsulation
370      name: Vlan35
371  ---
372  - metadata:
373      name: ByodBoundary
374      creationDate:
375        formatted: "2019-09-02T15:39:09.217Z"
376        uid: bf8d5ef-52d5-44b2-074c-fea9babe20c7
377      kind: Boundary
378    delimits:
379    - name: BYOD
380    transformation:
381      kind: VLANEncapsulation
382      name: Vlan40
383  ---
384  - metadata:
385      name: MainTrunk
386      creationDate:
387        formatted: "2019-09-02T15:39:09.303Z"
388        uid: b5dc8c8b-5697-48c5-b422-ae343c917767
389      kind: Trunk
390    location:
391      name: Branch Office
392    boundaries:
393    - name: PrintBoundary
394    - name: PhonesBoundary
395    - name: CompaBoundary
396    - name: ByodBoundary
397  ---
```

```
301  - metadata:
302      name: Tap1
303      creationDate:
304        formatted: "2019-09-02T15:39:09.542Z"
305        uid: 0be9ff0c-196c-4167-9d4f-7ccef058ca45
306      kind: VantagePoint
307      ingresstype: TAP
308    location:
309      name: Branch Office
310    trunks:
311    - name: MainTrunk
312  ---
313  - metadata:
314      name: Tap3
315      creationDate:
316        formatted: "2019-09-02T15:39:09.536Z"
317        uid: cc023ea3-fa04-4d82-b0e3-ba9d5f157198
318      labels:
319      - key: TappingType
320        value: agent based
321      kind: VantagePoint
322      ingresstype: TAP
323    location:
324      name: Computers
325    trunks: []
326  ---
327  - metadata:
328      name: Tap2
329      creationDate:
330        formatted: "2019-09-02T15:39:09.447Z"
331        uid: 31e234a4-2b5e-4798-8c19-a9d29e6fa3e5
332      kind: VantagePoint
333      ingresstype: SPAN
334    location:
335      name: Branch Office
336    trunks: []
337  ---
```

FIG. 3C

METHODS, SYSTEMS AND COMPUTER READABLE MEDIA FOR PROVIDING A DECLARATIVE NETWORK MONITORING ENVIRONMENT

TECHNICAL FIELD

The subject matter described herein relates to network monitoring. More particularly, the subject matter described herein relates to methods, systems, and computer readable media for providing a declarative network monitoring environment.

BACKGROUND

Network operators may use network visibility tools or related systems to identify or monitor various aspects about their networks. For example, a network operator may use a network visibility system to configure network taps throughout a network to identify workload metrics, track traffic trends, or detect bandwidth concerns. While network visibility systems may allow a user to performing various monitoring customizations, such customizations may require the user to have significant domain knowledge and require the user to spend significant time and effort to correctly implement them. Hence, conventional network visibility systems may be difficult to configure for various types of monitoring scenarios and/or environments, especially for network operators that are less aware of relevant network topology or other infrastructure related details.

SUMMARY

The subject matter described herein includes methods, systems, and computer readable media for providing a declarative network monitoring environment. A method for providing a declarative network monitoring environment includes providing an available tool registry for storing tool information associated with networking monitoring tools that are available for use; providing a potential tool registry for storing tool information associated with networking monitoring tools that are potentially available for use; receiving declarative network monitoring input indicating a desire by a user to perform a monitoring related task; determining, using the declarative network monitoring input and the available tool registry and/or the potential tool registry, at least one set of tool configurations for configuring network monitoring tools to perform the monitoring related task; and providing the at least one set of tool configurations.

A system for providing a declarative network monitoring environment includes at least one processor, a memory and a network monitoring system implemented using the at least one processor and the memory. The network monitoring system is configured for: providing an available tool registry for storing tool information associated with networking monitoring tools that are available for use; providing a potential tool registry for storing tool information associated with networking monitoring tools that are potentially available for use; receiving declarative network monitoring input indicating a desire by a user to perform a monitoring related task; determining, using the declarative network monitoring input and the available tool registry and/or the potential tool registry, at least one set of tool configurations for configuring network monitoring tools to perform the monitoring related task; and providing the at least one set of tool configurations.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which:

FIGS. 3A-3C are diagrams illustrating example network manifest information;

DETAILED DESCRIPTION

Figure 1:
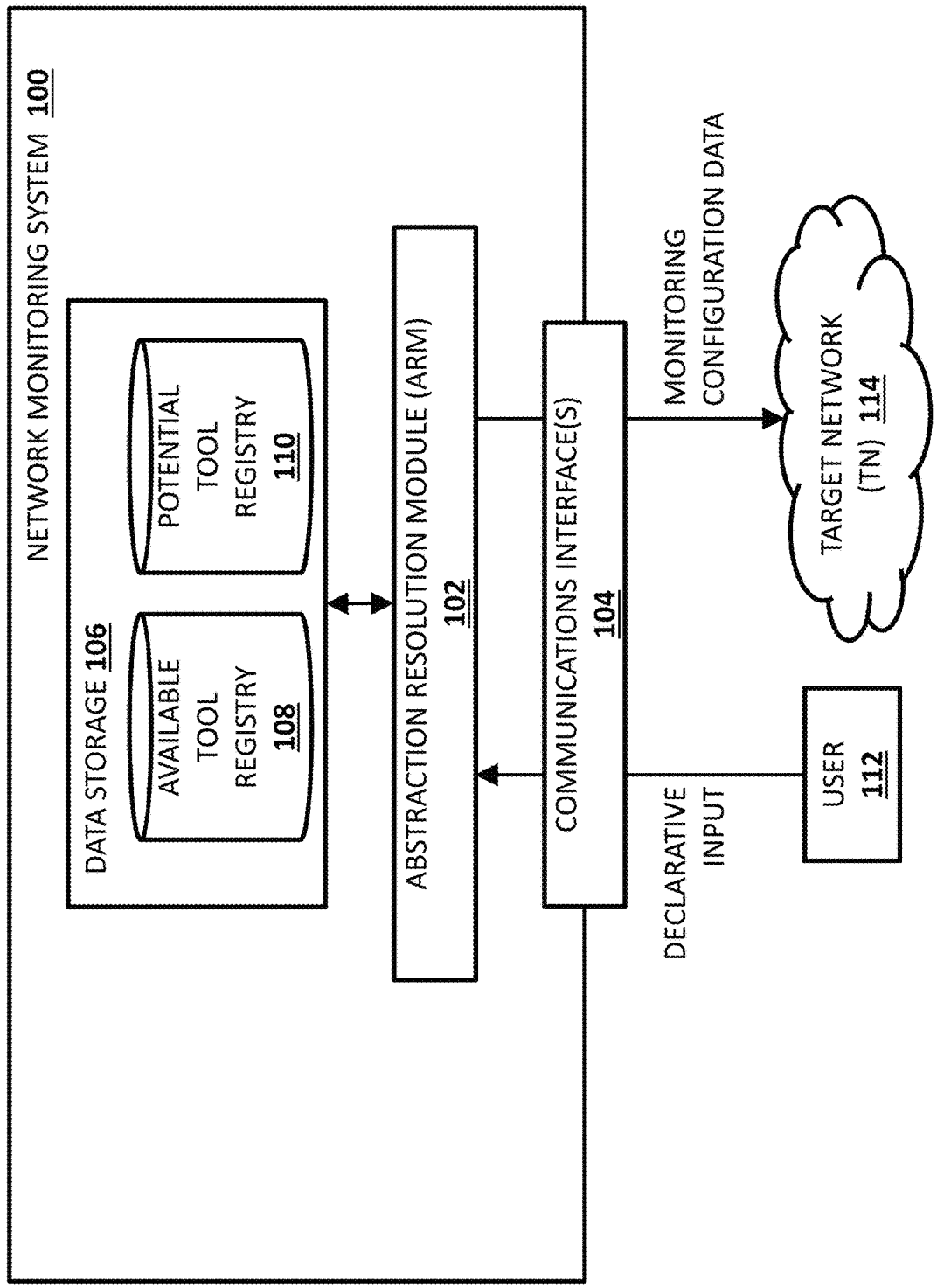
FIG. 1 is a block diagram illustrating an example network monitoring system.

The subject matter described herein includes methods, systems, and computer readable media for providing a declarative network monitoring environment. Network operators may use network visibility tools or related systems to identify various aspects about their network. For example, a network operator may configure network taps throughout a network to identify workload metrics and/or traffic trends. While network visibility systems may allow for various customizations, such customizations may require significant time, effort, and domain knowledge to implement. Hence, conventional network visibility systems may be difficult to configure for various types of monitoring scenarios and/or environments, especially for network operators that are less aware of the network topology or other infrastructure related details.

In accordance with some aspects of the subject matter described herein, techniques, methods, or mechanisms are disclosed for providing a declarative network monitoring environment. For example, a network monitoring system in accordance with aspects described herein may be configured for receiving declarative network monitoring input indicating a desire by a user to perform a monitoring related task;

determining, using the declarative network monitoring input, an available tool registry, and a potential tool registry, at least one set of tool configurations for configuring network monitoring tools to perform the monitoring related task; and providing the at least one set of tool configurations.

In accordance with some aspects of the subject matter described herein, techniques, methods, or mechanisms are disclosed for identifying potential network monitoring tools for effecting a network monitoring related task. For example, a network monitoring system in accordance with aspects described herein may be configured for receiving declarative network monitoring input indicating a desire by a user to perform a monitoring related task; determining, using the declarative network monitoring input and an available tool registry, a plurality of available tools that are usable for performing the monitoring related task; determining that performing the monitoring related task using the plurality of available tools is problematic; identifying, using a potential tool registry, a plurality of potential tools to use for performing the monitoring related task; and receiving user approval to use at least one of the plurality of potential tools.

Advantageously, in accordance with some aspects of the subject matter described herein, network monitoring systems can be improved by providing a user (e.g., a network operator, a data center technician, a network engineer, etc.) with the ability to define declarative monitoring and/or analytics intent (e.g., input that indicates a monitoring related task but does not provide explicit configuration instructions for performing the monitoring related task). For example, a user can provide declarative network monitoring input for performing a monitoring related task, where the input may specify, indirectly or directly, one or more network monitoring tools for performing the monitoring related task. The monitoring system may then use the declarative network monitoring input to determine specific tool configurations and/or related instructions for the one or more network monitoring tools for performing the monitoring related task. In some embodiments, the network monitoring tools needed for a monitoring related task will already be available (e.g., owned and located within the target network) and, as such, determining specific tool configurations and/or related instructions may be based on these available tools. In some embodiments, the network monitoring tools needed for a monitoring related task may require potentially available tools (e.g., features or packages that can bought or added to for one or more existing tools in a target network) and, as such, determining specific tool configurations and/or related instructions may involve determining one or more sets of configurations that involve various amount of available tools and potentially available tools.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a block diagram illustrating an example NMS 100. Referring to FIG. 1, an example communications environment may include a network monitoring system (NMS) 100, a user 112, and a target network (TN) 114. NMS 100 may represent any suitable entity (e.g., one or more computing platforms or a testing tool implemented using at least one processor) for performing various aspects associated with controlling, configuring, and/or facilitating network monitoring and/or a related task (e.g., analytics) in TN 114. For example, NMS 100 may include one or more modules (e.g., software executing on one or more processors) for receiving declarative input (e.g., via a graphical user interface (GUI), an application user interface (API), or another user interface (UI)) from user 112, for determining various tool configurations for implementing a monitoring related task indicated by the declarative input, and for sending the tool configurations to various network monitoring tools (e.g., network taps, packet brokers, firewalls, intrusion protection system (IPS) nodes, etc.) associated with TN 114.

User 112 may be any entity (e.g., an automated system or a device or system controlled or controllable by a human user) for selecting and/or configuring various aspects associated with network monitoring and/or related activities. For example, user 112 may provide declarative input associated with a monitoring related task via one or more UIs. Example UIs for interacting with NMS 100 and/or for providing declarative input may support automation (e.g., via one or more scripting languages), a representation state transfer (REST) API, a command line, and/or a web based GUI.

TN 114 may represent various network nodes, tools, equipment, and/or devices associated with an enterprise, a service provider, or another entity. For example, TN 114 may represent a live or production network controlled or managed by an Internet service provider, a telecommunications service provider, or a web-based application (e.g., cloud service) provider. In another example, TN 114 may represent a test or non-production network used for testing purposes.

In some embodiments, TN 114 may include one or more network monitoring tools or related functionality, e.g., network taps, packet brokers, firewalls, IPS nodes, etc. For example, a network tap may represent any suitable entity (e.g., a physical tap or network tap software implemented using at least one processor) for monitoring traffic and/or observing network behavior. In this example, the network tap may monitor network traffic traversing a physical or virtual data link and may compute various metrics associated with the network traffic. Continuing with this example, the metrics may relate to bandwidth utilization and/or a traffic breakdown by applications or protocols.

In some embodiments, NMS 100 may include an abstraction resolution module (ARM) 102, a communications interface(s) 104, and a data storage 106 containing an available tool registry (ATR) 108 and a potential tool registry (PTR) 110. ARM 102 may represent any suitable entity or entities (e.g., software executing on at least one processor, a field-programmable gateway array (FPGA), an application-specific integrated circuit (ASIC), or a combination of software, an ASIC, or an FPGA) for performing one or more aspects associated resolving declarative input and/or providing one or more sets of tool configurations for effecting or implementing one or more tasks associated with the declarative input. For example, ARM 102 may be configured for receiving declarative input associated with network monitoring, analyzing the declarative input, determining, using the declarative input and ATR 108 and/or PTR 110, at least one set of tool configurations for configuring network monitoring tools to perform the monitoring related task; and providing the at least one set of tool configurations to user 112.

In some embodiments, ARM 102 or a related entity may provide potential implementation plans (e.g., sets of tool configurations) to user 112 (e.g., via a GUI) such that user 112 can select the implementation plan to use. In some embodiments, ARM 102 or a related entity may automatically select the implementation plan to enact based on one or more factors, e.g., impact to current network, time required to enact implementation, number of tools utilized, similarity to a prior user-selected plan, or a metric based on multiple factors and/or user preferences.

Communications interface(s) 104 may represent any suitable entity or entities (e.g., one or more network interface cards) for sending and/or receiving communications associated with user 112 and/or various types of network monitoring tools. For example, communications interface(s) 104 may represent a first interface for communicating with packet broker systems in TN 114 and a second interface for communicating with network taps 114-118.

In some embodiments, communications interface(s) 104 may also represent one or more additional interfaces (e.g., a web-based management GUI, an API, etc.) for receiving declarative input from user 112. For example, using communications interface(s) 104, a touchscreen or GUI associated with NMS 100 may allow user 112 to provide input requesting all VPN traffic in the user's corporate network in Austin, Tex. In this example, the declarative input may not specify details of the actual traffic that is to be monitored and or the tools that will be used to perform the monitoring (e.g., IF addresses, flow tuples, monitoring ports, etc.)

Data storage 106 may represent any suitable entity (e.g., a computer readable medium, a database, a storage device, or memory) for storing declarative input, network configuration information, network traffic simulation information, tool related information, and/or other data. For example, data storage 106 may store historical sets of tool configurations derived from various declarative input and may associated them with various other data for correlation and/or user experience. In this example, historical declarative input and/or selected implementations based on the declarative input from a particular user, a particular network segment, and/or a particular time period may be grouped or associated and may be provided to user 112 via a GUI or other UI.

In some embodiments, data storage 106 may include ATR 108 and PTR 110. ATR 108 may represent one or more data structures containing tool information associated with network monitoring tools that are available for use. For example, ATR 108 may include a listing of network monitoring tools (e.g., nodes, components, analytic tools, and/or related services) that are currently available for use. In this example, tools that are currently available for use may include any nodes, components, analytic tools, and/or related services which are owned or licensed for use by user 112. In some embodiments, ATR 108 may include configuration data and/or connectivity information associated with those currently available network monitoring tools.

PTR 110 may represent one or more data structures containing tool information associated with network monitoring tools that are potentially available for use. For example, PTR 110 may include a listing of network monitoring tools (e.g., devices, components, analytic tools, and/or related services) that are currently unavailable for use. In this example, tools that are currently unavailable for use may include any nodes, components, analytic tools, and/or related services which are not owned or not licensed for use by user 112 but could be obtained or acquired. In some embodiments, PTR 110 may include configuration data and/or connectivity information associated with those currently unavailable network monitoring tools.

In some embodiments, information stored in ATR 108 or PTR 110 may include physical location information, network address information, bandwidth capacity information, ingress and egress port information, internal processing capability information, internal memory and/or storage capacity information, key performance indicator (KPI) information (e.g., average latency, jitter, etc.), communication link information, connectivity information, etc.

In some embodiments, data storage 106 may include network topology information associated with TN 114. Example network topology information may include information about various network elements, network element configuration information, inter-tool link information, link protocol information, application identifying information, access control list information, and network administrator identifying information, etc. In some embodiments, network topology information may be manually provisioned or may be automatically detected and provisioned via scanning TN 114 using scripts, network or tool discovery protocols or other mechanisms.

In some embodiments, ARM 102 may be configured to receive declarative input, e.g., declarative or intent formatted commands and statements. ARM 102 may include logic and/or algorithms to effectively translate the user's declarative input (e.g., an intent to perform a monitoring related task) into a viable monitoring implementation or deployment (e.g., based on an implementation plan that include tool specific configurations) that uses currently available network monitoring tools and/or a hypothetical monitoring implementation or deployment that uses at least one or more potential network monitoring tools that could be available for use (e.g., if purchased or feature set is upgraded).

In some embodiments, ARM 102 or a related entity may receive declarative input that indicates, indirectly or directly, one or more network monitoring tools for performing the monitoring related task. For example, in addition to declaring a monitoring related task, user 112 may directly or indirectly specify one or more network monitoring tools (e.g., devices, components, analytic tools, and/or related services) to use when performing the monitoring related task.

In some embodiments, a direct tool indication may involve user 112 using a GUI to visually select particular one or more network monitoring tools. For example, ARM 102 or another entity may provide a GUI that displays a list of available tools or related identifiers obtained from ATR 108 and allows user 112 to select one or more from the list (e.g., 'tap_device_123234', 'tap_device_1314', 'tap_device_5234', etc.).

In some embodiments, an indirect tool indication may involve user 112 providing declarative input that indicates relevant network monitoring tools, e.g., based on location and/or other factors. For example, ARM 102 or a related entity may receive declarative input (e.g., via an API or other interface) indicating a monitoring related task that uses all the network monitoring tools in an 'Austin, Tx' data center. In this example, ARM 102 or another entity may query ATR 108 to identify all the network monitoring tools in the 'Austin, Tx' data center, and to subsequently configure some or all of them to perform a relevant monitoring related task.

In some embodiments, ARM 102 or a related entity may determine or use declarative input from user 112 to generate one or more potential implementation plans based, at least in part, on tool information stored in ATR 108 and PTR 110. For example, ARM 102 may evaluate network topology, network capacity, and network performance information associated with declarative input and may determine one or more potential implementation plans for implementing or effecting a monitoring related task associated with the declarative input. In this example, each potential implementation plan may include a set of tool configurations for configuring particular network monitoring tools to perform the monitoring related task.

In some embodiments, ARM 102 or a related entity (e.g., a simulation module) may be configured for analyzing an implementation plan (e.g., a set of tool specific configurations and related settings) and determining whether the implementation plan would encounter resource limitations or performance issues (e.g., port overload, processing resource exhaustion, etc.) that might impair or interfere with related declarative input from user 112.

In some embodiments, e.g., if an implementation plan is determined to be problematic or likely to be problematic, ARM 102 or a related entity may identify, using PTR 110, a plurality of potential tools to use, e.g., in addition to or in lieu of one or more tools in the implementation plan determined to be problematic or likely to be problematic. For example, ARM 102 or another entity may generate an implementation plan using available tools from ATR 108. In this example, before implementing or presenting to user 112, ARM 102 or a related entity may validate the implementation plan by comparing resource availability (e.g., throughput or processing speed) at a first network monitoring tool and determine that an expected increase in resource usage from a monitoring related task associated with the implementation plan is greater than the current resource availability at the first network monitoring tool. Continuing with this example, ARM 102 or another entity may determine that one or more potential tools (e.g., an upgraded version of the first network monitoring tool) may be capable of handling the increased resource usage and/or otherwise alleviate issues with the original implementation plan.

In some embodiments, after determining potential network monitoring tools that can improve or remedy a potentially problematic implementation plan for effecting a monitoring related task, ARM 102 or another entity may allow user 112 to select one or more potential network monitoring tools (e.g., components, analytic tools, and/or services) to use for implementing a monitoring related task associated with declarative input. For example, via a GUI provided by ARM 102, user 112 may be provided with a number of potential network monitoring tools that can be used in one or more implementations plans determined to be problematic (e.g., plans that may experience resource limitations or performance issues).

In some embodiments, user 112 can approve (e.g., select and/or confirm) one or more potential network monitoring tools for use in an implementation plan prior to effecting the implementation plan, e.g., prior to sending tool configurations to various tools in TN 114. For example, user 112 can select a potential tool for use with an implementation plan and, prior to implementation, ARM 102 or another entity may facilitate or perform the purchase of the potential network monitoring tool and/or a related license so that the potential network monitoring tool is available for use. In this example, once a potential network monitoring tool is purchased, licensed, and/or acquired, the network monitoring tool and/or related information may be added to (e.g., stored in) ATR 108.

In some embodiments, in lieu of user 112 approving an implementation plan or a potential network monitoring tool to use (e.g., purchase or license, ARM 102 or a related entity may automatically select one or more potential network monitoring tools for a selected implementation plan to enact. For example, user 112 may provide user preferences or settings (e.g., cost limits, priority levels, etc.) which may be used by ARM 102 or another entity for determining whether a potential network monitoring tool is to be used or a particular implementation plan is to be implemented. In this example, in addition to or in lieu of user preferences or settings, automatic selections may be based on various factors, e.g., impact to current network, time required to enact implementation, number of tools utilized, similarity to a prior user-selected plan, or a metric based on multiple factors and/or user preferences.

It will be appreciated that FIG. 1 is for illustrative purposes and that various depicted entities, their locations, and/or their functions described above in relation to FIG. 1 may be changed, altered, added, or removed.

Figure 2:
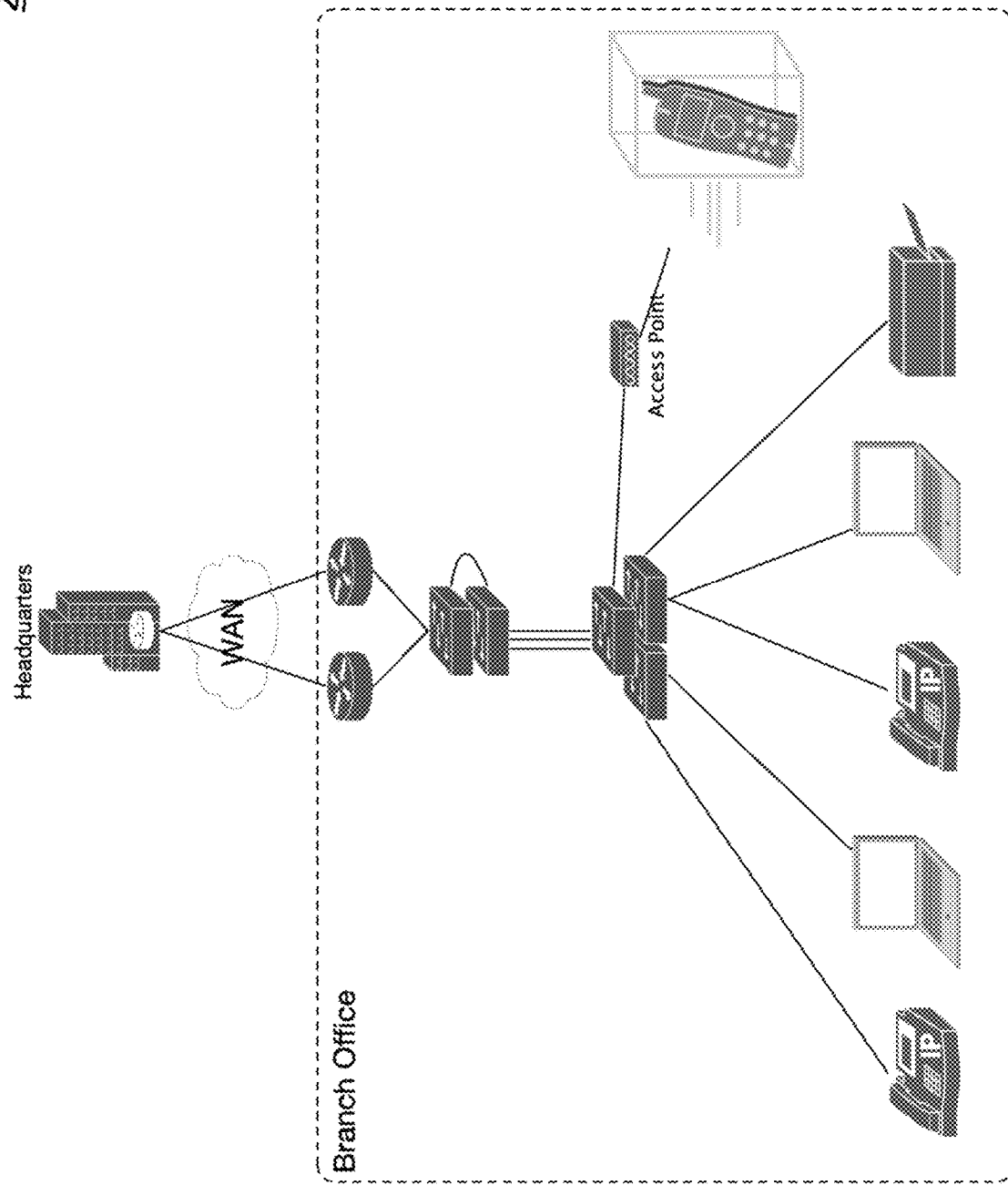
FIG. 2 is a block diagram illustrating an example network model representing a target network.

FIG. 2 is a diagram illustrating an example network model representing TN 114. In some embodiments, network model 200 may be an approximation of TN 114 or a portion thereof. For example, ARM 102 or another entity may receive or obtain network topology information, network element information, and/or other related information from user 112 (e.g., via a network manifest data file) and/or other sources. In this example, using this information, ARM 102 or another entity may generate and provide a visual representation of network model 200 to user 112. In some embodiments, network model 200 or related data may be stored in one or more data structures, e.g., in data storage 106.

Referring to FIG. 2, network model 200 may represent a wide area network (WAN) connecting a headquarters location and a branch office location. In some embodiments, the headquarters location may include a WAN gateway, a router, or other network equipment for communicating with the branch office. In some embodiments, the branch office may include multiple WAN gateway or routers, switches for handling various virtual local area networks, an access point for handling wireless endpoints, and various types of user devices or endpoints.

In some embodiments, ARM 102 or another entity may provide network model 200 to user along with UI elements for inputting and/or displaying various details about represented the network, e.g., network elements, connections, or other related details. For example, via a GUI provided by ARM 102 or another entity related to NMS 100, user 112 may add or remove network elements in network model 200, may add, remove, or edit details about network elements in network model 200, including, e.g., adding, deleting, or editing connections between devices or tools in network model 200. In this example, ARM 102 or another entity may allow users to select icons (e.g., from a list of icons) for representing various network elements (e.g., partitions, devices, tools, services, etc.), connections, or other details.

It will be appreciated that network model 200 and its related description are for illustrative purposes and that additional and/or different UI elements may be usable for displaying, inputting, or interacting with declarative input for one or more monitoring related tasks.

Figure 3A:
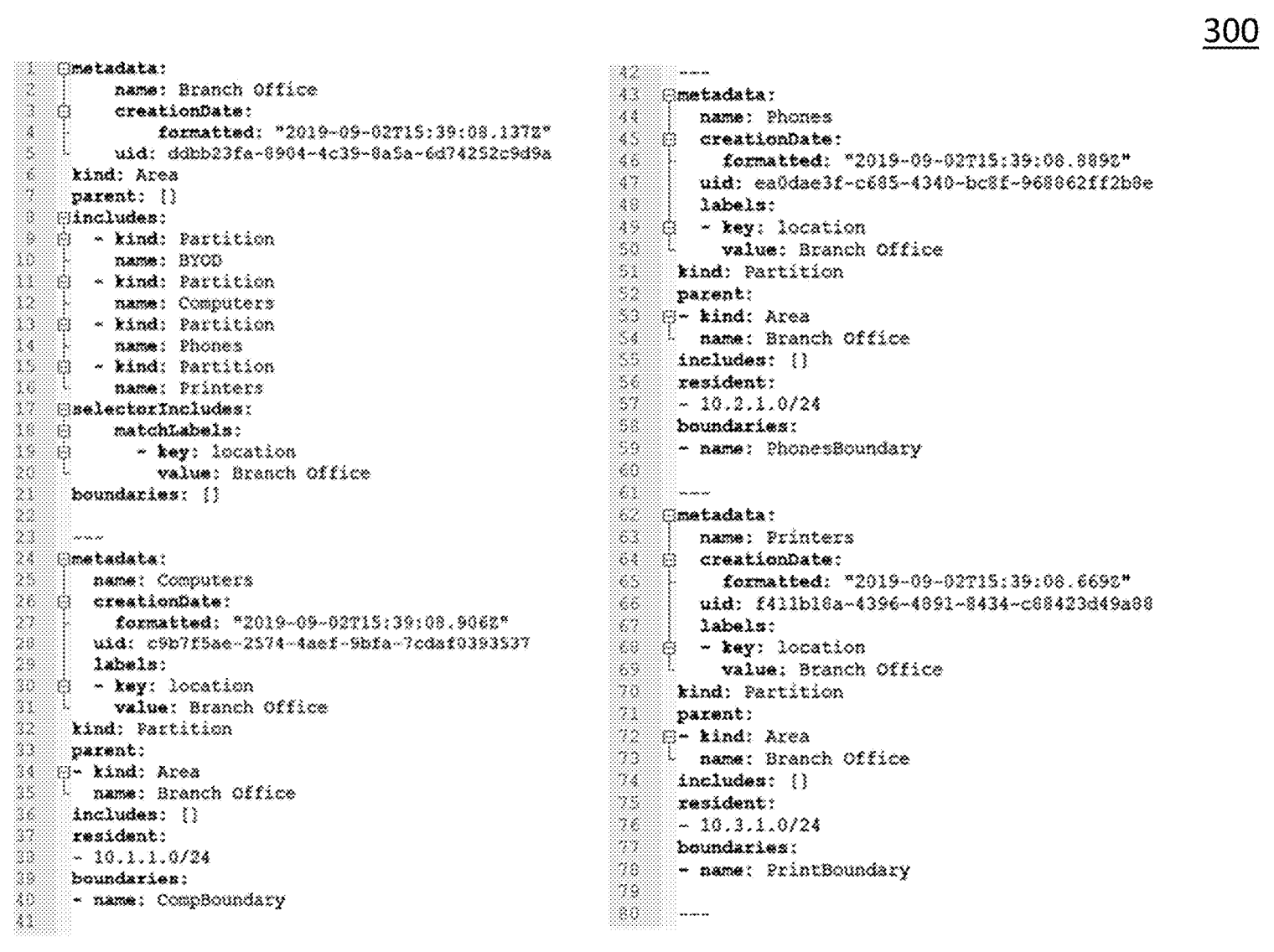

FIGS. 3A-3C are diagrams illustrating example network manifest information 300. In some embodiments, network manifest information 300 may be provided in a data file (e.g., using a human-readable and/or a computer-readable format) to ARM 102 or another entity and may include various details about a network or one or more element therein. In some embodiments, network manifest information 300 may be usable for determining potential implementation plans (e.g., sets of tool configurations) and/or usable for displaying or representing network model 200.

Referring to FIG. 3A, lines 1-21 of network manifest information 300 may include a 'Branch Office' metadata element indicating a name (line 2), a formatted creation date (line 4), a universal identifier (UID) (line 5), a kind identifier (line 6), parent information (line 7), included partitions information (lines 7-16), match labels information (lines 18-20) and boundaries information (line 21).

Lines 24-40 of network manifest information 300 may include a 'Computers' metadata element indicating a name (line 25), a formatted creation date (line 27), a UID (line 28), labels information (lines 29-31), a kind identifier (line 32), parent information (lines 33-35), resident (e.g., network range) information (lines 37-38), and boundaries information (lines 39-40).

Lines 43-59 of network manifest information 300 may include a 'Phones' metadata element indicating a name (line 44), a formatted creation date (line 46), a UID (line 47), labels information (lines 48-50), a kind identifier (line 51), parent information (lines 52-54), resident (e.g., network range) information (lines 56-57), and boundaries information (lines 58-59).

Lines 62-78 of network manifest information 300 may include a 'Printers' metadata element indicating a name (line 63), a formatted creation date (line 65), a UID (line 66), labels information (lines 67-69), a kind identifier (line 70), parent information (lines 71-73), resident (e.g., network range) information (lines 75-76), and boundaries information (lines 77-78).

Referring to FIG. 3B, lines 81-97 of network manifest information 300 may include a 'BYOD' metadata element indicating a name (line 82), a formatted creation date (line 84), a UID (line 85), labels information (lines 86-88), a kind identifier (line 89), parent information (lines 90-92), resident (e.g., network range) information (lines 94-95), and boundaries information (lines 96-97).

Lines 99-107 of network manifest information 300 may include a 'VLAN40' metadata element indicating a name (line 100), a formatted creation date (line 102), a UID (line 103), a kind identifier (line 104), performers (e.g., users) information (lines 105-106), and a VLAN tag identifier (line 107).

Lines 109-117 of network manifest information 300 may include a 'VLAN37' metadata element indicating a name (line 110), a formatted creation date (line 112), a UID (line 113), a kind identifier (line 114), performers (e.g., users) information (lines 115-116), and a VLAN tag identifier (line 117).

Lines 119-127 of network manifest information 300 may include a 'VLAN25' metadata element indicating a name (line 120), a formatted creation date (line 122), a UID (line 123), a kind identifier (line 124), performers (e.g., users) information (lines 125-126), and a VLAN tag identifier (line 127).

Lines 129-137 of network manifest information 300 may include a 'VLAN16' metadata element indicating a name (line 130), a formatted creation date (line 132), a UID (line 133), a kind identifier (line 134), performers (e.g., users) information (lines 135-136), and a VLAN tag identifier (line 137).

Lines 139-149 of network manifest information 300 may include a 'PrintBoundary' metadata element indicating a name (line 140), a formatted creation date (line 142), a UID (line 143), a kind identifier (line 144), delimits information (lines 145-146), and transformation information (lines 147-149).

Lines 151-161 of network manifest information 300 may include a 'CompBoundary' metadata element indicating a name (line 152), a formatted creation date (line 154), a UID (line 155), a kind identifier (line 156), delimits information (lines 157-158), and transformation information (lines 159-161).

Referring to FIG. 3C, lines 163-173 of network manifest information 300 may include a 'PhonesBoundary' metadata element indicating a name (line 164), a formatted creation date (line 166), a UID (line 167), a kind identifier (line 168), delimits information (lines 169-170), and transformation information (lines 171-173).

Lines 175-185 of network manifest information 300 may include a 'ByodBoundary' metadata element indicating a name (line 176), a formatted creation date (line 178), a UID (line 179), a kind identifier (line 180), delimits information (lines 181-182), and transformation information (lines 183-185).

Lines 187-199 of network manifest information 300 may include a 'MainTrunk' metadata element indicating a name (line 188), a formatted creation date (line 190), a UID (line 191), a kind identifier (line 192), location information (lines 193-195), and related boundaries information (lines 195-199).

Lines 201-211 of network manifest information 300 may include a 'Tap1' metadata element indicating a name (line 202), a formatted creation date (line 204), a UID (line 205), a kind identifier (line 206), an ingress type value (line 207), location information (lines 208-209), and trunks information (lines 210-211).

Lines 213-225 of network manifest information 300 may include a 'Tap3' metadata element indicating a name (line 214), a formatted creation date (line 216), a UID (line 217), labels information (lines 218-220), a kind identifier (line 221), an ingress type value (line 222), location information (lines 223-224), and trunks information (line 225).

Lines 227-236 of network manifest information 300 may include a 'Tap2' metadata element indicating a name (line 228), a formatted creation date (line 230), a UID (line 231), a kind identifier (line 232), an ingress type value (line 233), location information (lines 234-235), and trunks information (line 236).

It will be appreciated that network manifest information 300 and related description are for illustrative purposes and that additional and/or different information than that depicted in FIGS. 3A-3C may be usable for representing a network or related aspects thereof.

Figure 4:
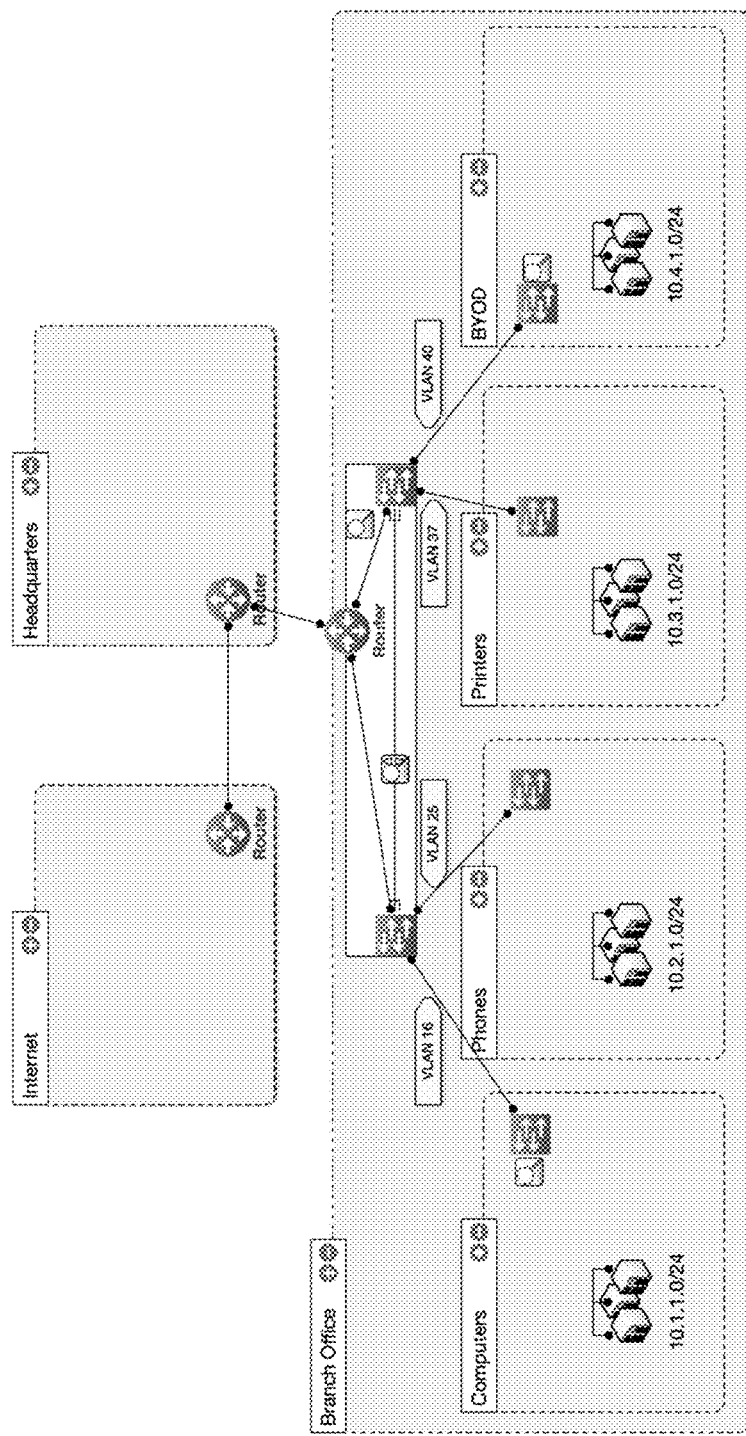
FIG. 4 is a diagram illustrating example graphical user interface for providing declarative input and/or for displaying an implementation plan.

FIG. 4 is a diagram illustrating an example GUI 400 for providing declarative input and/or for displaying an implementation plan. In some embodiments, GUI 400 may represent a page provided by a web-based management portal or a user application associated with or provided by NMS 100 or a related entity. For example, GUI 400 may provide a visual network model 200 along with UI elements for receiving and displaying declarative input from user 112. In this example, GUI 400 may utilize various icons to depict network related information based at least in part on network manifest information 300. In this example, GUI 400 may also provide various UI elements for allowing the user to visually declare an intent for network monitoring, e.g., by adding network tap icons or other network monitoring tool icons at a network element, along a connection or link, or within a partition (e.g., a sub-network).

In some embodiments, GUI 400 may provide one or more potential implementation plans. For example, after user 112 has provided declarative input related to a monitoring related task, GUI 400 may be updated to display a related implementation plan. In this example, the implementation plan may be depicted using various UI elements (e.g., visual overlays, texts and/or multiple colors) to indicate changes, suggestions, or potential tools to use. In this example, GUI 400 may be used to request and receive user approval for a potential implementation plan or related aspects (e.g., whether to purchase and use a potential network monitoring tool).

Referring to FIG. 4, GUI 400 may include groups of UI elements for displaying, inputting, or interacting with various types of data associated with network monitoring. As depicted in FIG. 4, a 'Branch Office' area or site includes a 'Computers' partition (e.g., sub-network), a 'Phones' partition, a 'Printers' partition, and a 'BYOD' partition. Each of the partitions include a unique range of network addresses, a particular VLAN identifier, and a switch for connecting to one of a plurality of switches in a 'Main Trunk' element (e.g., a network gateway or related systems) of the 'Branch Office' area. The main trunk may also include a router for communicating with a 'Headquarters' area or site that communicates with an 'Internet' area or site.

GUI 400 may utilize one or more icons (e.g., a magnifying glass) for indicating existing or potential network monitoring tools in TN 114 or a related network model 200. As depicted in FIG. 4, one network monitoring tool may be located at a switch in the 'Computers' partition, another network monitoring tool may be located at a switch in the 'BYOD' partition, another network monitoring tool may be located at a switch in the 'Main Trunk' element, and another network monitoring tool (e.g., a network tap) may be located along a link connecting two switches in the 'Main Trunk' element.

In some embodiments, GUI 400 may provide interactive UI elements that allows user 112 to hover over or click on various icons representing network elements or other aspects therein. For example, user 112 may receive various tool specific information (e.g., a UID, a status, a physical location, and/or various configurations or settings) by clicking or hovering over each magnifying glass icon in GUI 400.

It will be appreciated that GUI 400 and its related description are for illustrative purposes and that additional and/or different UI elements may be usable for displaying, inputting, or interacting with declarative input for one or more monitoring related tasks.

Figure 5:
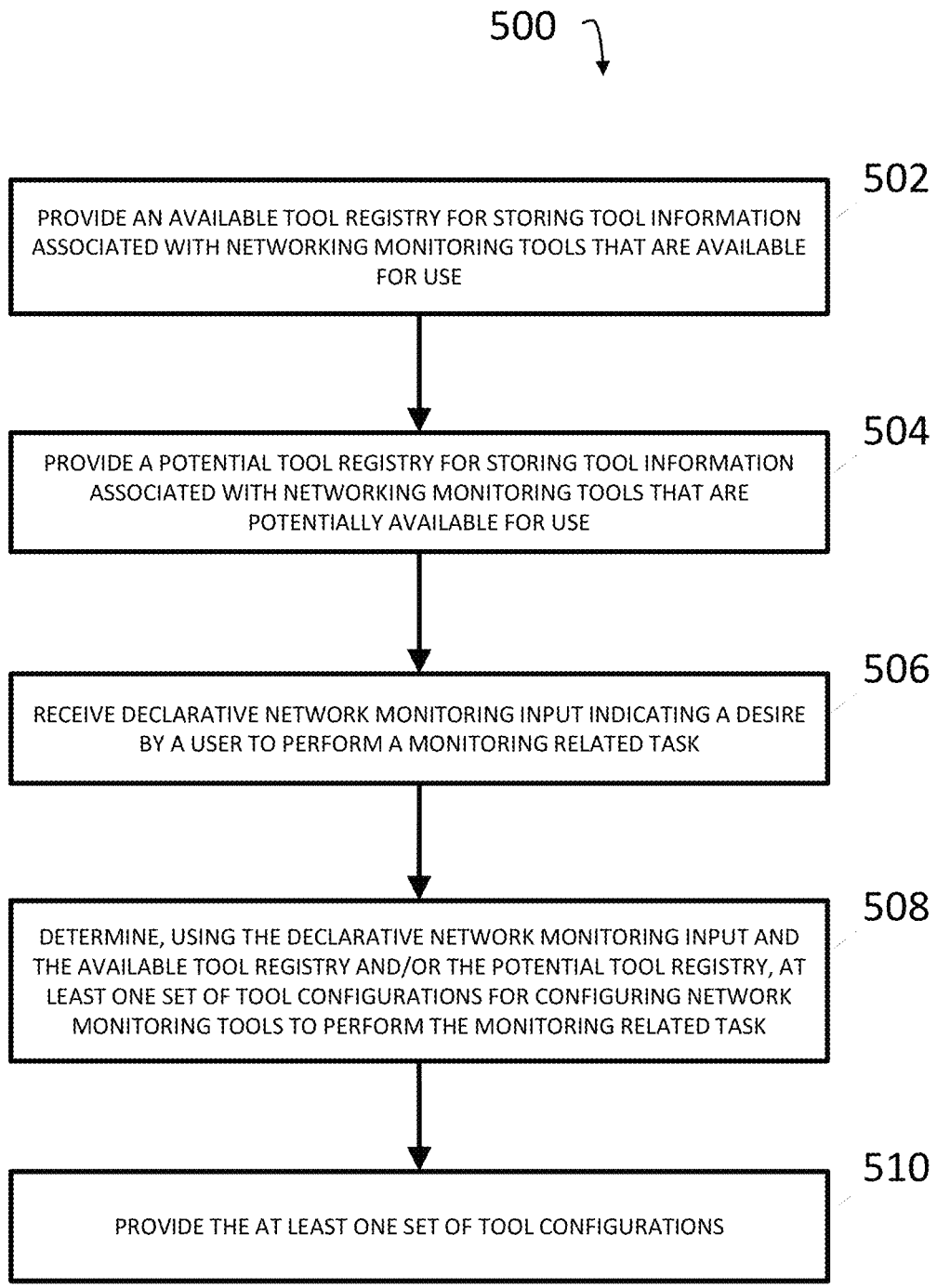
FIG. 5 is a flow chart illustrating an example process for providing a declarative network monitoring environment.

FIG. 5 is a diagram illustrating an example process 900 for providing a declarative network monitoring environment. In some embodiments, process 500, or portions thereof, may be performed by or at NMS 100, ARM 102, and/or another node or module. In some embodiments, process 500 may include steps 502, 504, 506, 508, and/or 510.

Referring to process 500, in step 502, an available tool registry may be provided. For example, ATR 108 may store tool information associated with networking monitoring tools that may be available for use;

In step 504, a potential tool registry may be provided. For example, PTR 110 may store tool information associated with networking monitoring tools that may be potentially available for use.

In step 506, declarative network monitoring input indicating a desire by a user to perform a monitoring related task may be received.

In step 508, at least one set of tool configurations for configuring network monitoring tools to perform the monitoring related task may be determined using the declarative network monitoring input and the available tool registry and/or the potential tool registry.

In step 510, the at least one set of tool configurations may be provided. For example, ARM 102 may provide various tool configurations to network monitoring tools in TN 114. In another example, ARM 102 may provide an implementation plan (e.g., tool configurations and/or related data) to user 112 via a web based management portal. In this example, user 112 may modify or approve the implementation plan before tool configurations or related instructions are sent to network monitoring tools in TN 114.

In some embodiments, determining at least one set of tool configurations may include using network topology information to identify network monitoring tools to perform a monitoring related task.

In some embodiments, tool information stored in ATR 108 or PTR 110 may be provided via a network operator, a UI, an API, or a tool discovery mechanism.

In some embodiments, a monitoring related task may include generating or obtaining network traffic metrics, detecting network congestion or other network conditions, detecting network traffic having predetermined characteristics, detecting malicious network traffic, or determining one or more network traffic trends.

In some embodiments, a network monitoring tool may include a network tap, a network packet broker, a security node, a firewall, a network firewall, an application firewall, or an IPS node.

In some embodiments, declarative network monitoring input may be provided via a GUI, a UI, a data file, or an API.

In some embodiments, tool information in ATR 108 may include physical location information, network address information, bandwidth capacity information, ingress and egress port information, internal processing capability information, internal storage capacity information, performance information, communication link information, and/or connectivity information.

In some embodiments, process 500 further comprises determining at least one set of tool configurations comprises: determining, using ATR 108, a plurality of available tools that may be usable for performing the monitoring related task; determining that performing the monitoring related task using the plurality of available tools may be problematic; identifying, using PTR 110, a plurality of potential tools to use for performing the monitoring related task; and receiving user approval to use at least one of the plurality of potential tools.

In some embodiments, receiving user approval to use at least one of a plurality of potential tools may include adding the at least one of the plurality of potential tools to ATR 108.

It will be appreciated that process 500 is for illustrative purposes and that different and/or additional actions may be used. It will also be appreciated that various actions described herein may occur in a different order or sequence.

It should be noted that NMS 100, ARM 102, and/or functionality described herein may constitute a special purpose computing tool. Further, NMS 100, ARM 102, and/or functionality described herein can improve the technological field of network monitoring, including, e.g., performing traffic analysis and related analytics. For example, NMS 100 or ARM 102 allows user 112 to quickly and efficiently configure potentially complex monitoring related tasks without requiring the user to have an in-depth or detailed knowledge of network monitoring tools, e.g., tool configuration information, analytic service configuration settings, and connectivity settings. Hence, NMS 100 or ARM 102 may effectively configure network monitoring tools in TN 114 by using declarative input from user 112 and tool related information from various sources to generate one or more sets of tool configurations. Further, NMS 100 or ARM 102 may simulate or otherwise evaluate one or more plans for implementing a monitoring related task indicated by declarative input and, if a plan is deemed problematic (e.g., probable that the implementation would cause issues, like traffic latency or network congestion), NMS 100 or ARM 102 may suggest alternate plans that include potential tools that can be obtained (e.g., by upgrading or buying new feature(s) on existing tools in TN 114).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing a declarative network monitoring environment, the method comprising:
    providing an available tool registry for storing tool information associated with networking monitoring tools that are available for use by a user;
    providing a potential tool registry for storing tool information associated with networking monitoring tools that are potentially available for use by the user, wherein the potential tool registry refers to a first network monitoring device that is absent from the available tool registry, wherein the networking monitoring tools that are potentially available for use are unowned or unlicensed by the user;
    receiving declarative network monitoring input indicating a desire by a user to perform a monitoring related task;
    determining, using the declarative network monitoring input and the available tool registry and the potential tool registry, at least one set of tool configurations for configuring network monitoring tools to perform the monitoring related task, wherein determining the at least one set of tool configurations comprises:
        determining, using the available tool registry, a plurality of available tools that are usable for performing the monitoring related task;
        determining that performing the monitoring related task using the plurality of available tools is problematic;
        identifying, using user-provided cost limit information and the potential tool registry, a plurality of potential tools to use for performing the monitoring related task; and
        receiving user approval to use at least one of the plurality of potential tools, wherein the at least one of the plurality of potential tools includes the first network monitoring device, wherein receiving the user approval to use at least one of the plurality of potential tools includes adding the first network monitoring device to the available tool registry; and
        providing the at least one set of tool configurations.

2. The method of claim 1 wherein determining the at least one set of tool configurations includes using network topology information to identify the network monitoring tools to perform the monitoring related task.

3. The method of claim 1 wherein the tool information stored in the available tool registry or the potential tool registry is provided via a network operator, a user interface, an application programming interface, or a tool discovery mechanism.

4. The method of claim 1 wherein the monitoring related task includes generating or obtaining network traffic metrics, detecting network congestion or other network conditions, detecting network traffic having predetermined characteristics, detecting malicious network traffic, or determining one or more network traffic trends.

5. The method of claim 1 wherein the network monitoring tools include a network tap, a network packet broker, a security node, a firewall, a network firewall, an application firewall, or an intrusion protection or prevention system (IPS) node.

6. The method of claim 1 wherein the declarative network monitoring input is provided via a graphical user interface (GUI), a user interface, a data file, or an application programming interface (API).

7. The method of claim 1 wherein the tool information in the available tool registry includes physical location information, network address information, bandwidth capacity information, ingress and egress port information, internal processing capability information, internal storage capacity information, performance information, communication link information, and/or connectivity information.

8. A system for providing a declarative network monitoring environment, the system comprising:
    at least one processor;
    a memory; and
    a network monitoring system implemented using the at least one processor and the memory, wherein the network monitoring system is configured for:
        providing an available tool registry for storing tool information associated with networking monitoring tools that are available for use by a user;
        providing a potential tool registry for storing tool information associated with networking monitoring tools that are potentially available for use by the user, wherein the potential tool registry refers to a first network monitoring device that is absent from the available tool registry, wherein the networking monitoring tools that are potentially available for use are unowned or unlicensed by the user;
        receiving declarative network monitoring input indicating a desire by a user to perform a monitoring related task;
        determining, using the declarative network monitoring input and the available tool registry and the potential tool registry, at least one set of tool configurations for configuring network monitoring tools to perform the monitoring related task, wherein determining the at least one set of tool configurations comprises:
            determining, using the available tool registry, a plurality of available tools that are usable for performing the monitoring related task;
            determining that performing the monitoring related task using the plurality of available tools is problematic;
            identifying, using user-provided cost limit information and the potential tool registry, a plurality of potential tools to use for performing the monitoring related task; and
            receiving user approval to use at least one of the plurality of potential tools, wherein the at least one of the plurality of potential tools includes the first network monitoring device, wherein receiving the user approval to use at least one of the plurality of potential tools includes adding the first network monitoring device to the available tool registry; and
            providing the at least one set of tool configurations.

9. The system of claim 8 wherein the network monitoring system is configured for using network topology information to identify the network monitoring tools to perform the monitoring related task.

10. The system of claim 8 wherein the tool information stored in the available tool registry or the potential tool registry is provided via a network operator, a user interface, an application programming interface, or a tool discovery mechanism.

11. The system of claim 8 wherein the monitoring related task includes generating or obtaining network traffic metrics, detecting network congestion or other network conditions, detecting network traffic having predetermined characteristics, detecting malicious network traffic, or determining one or more network traffic trends.

12. The system of claim 8 wherein the network monitoring tools include a network tap, a network packet broker, a security node, a firewall, a network firewall, an application firewall, or an intrusion protection or prevention system (IPS) node.

13. The system of claim 8 wherein the declarative network monitoring input is provided via a graphical user interface (GUI), a user interface, a data file, or an application programming interface (API).

14. The system of claim 8 wherein the tool information in the available tool registry includes physical location information, network address information, bandwidth capacity information, ingress and egress port information, internal processing capability information, internal storage capacity information, performance information, communication link information, and/or connectivity information.

15. A non-transitory computer readable medium having stored thereon executable instructions that when executed by at least one processor of at least one computer cause the at least one computer to perform steps comprising:
   providing an available tool registry for storing tool information associated with networking monitoring tools that are available for use by a user;
   providing a potential tool registry for storing tool information associated with networking monitoring tools that are potentially available for use by the user, wherein the potential tool registry refers to a first network monitoring device that is absent from the available tool registry, wherein the networking monitoring tools that are potentially available for use are unowned or unlicensed by the user;
   receiving declarative network monitoring input indicating a desire by a user to perform a monitoring related task;
   determining, using the declarative network monitoring input and the available tool registry and the potential tool registry, at least one set of tool configurations for configuring network monitoring tools to perform the monitoring related task, wherein determining the at least one set of tool configurations comprises:
      determining, using the available tool registry, a plurality of available tools that are usable for performing the monitoring related task;
      determining that performing the monitoring related task using the plurality of available tools is problematic;
      identifying, using user-provided cost limit information and the potential tool registry, a plurality of potential tools to use for performing the monitoring related task; and
      receiving user approval to use at least one of the plurality of potential tools, wherein the at least one of the plurality of potential tools includes the first network monitoring device, wherein receiving the user approval to use at least one of the plurality of potential tools includes adding the first network monitoring device to the available tool registry; and
   providing the at least one set of tool configurations.

16. The non-transitory computer readable medium of claim 15 wherein determining the at least one set of tool configurations includes using network topology information to identify the network monitoring tools to perform the monitoring related task.

* * * * *